United States Patent
Sasaki et al.

(10) Patent No.: US 9,593,780 B2
(45) Date of Patent: *Mar. 14, 2017

(54) FORWARD CHECK VALVE AND FUEL CELL SYSTEM

(71) Applicant: Murata Manufacturing Co., Ltd., Nagaokakyo-shi, Kyoto-fu (JP)

(72) Inventors: Masahiro Sasaki, Nagaokakyo (JP); Yuzo Higashiyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 416 days.

This patent is subject to a terminal disclaimer.

(21) Appl. No.: 14/049,252

(22) Filed: Oct. 9, 2013

(65) Prior Publication Data
US 2014/0038083 A1 Feb. 6, 2014

Related U.S. Application Data

(63) Continuation of application No. PCT/JP2012/055180, filed on Mar. 1, 2012.

(30) Foreign Application Priority Data

Apr. 12, 2011 (JP) ................................. 2011-088083

(51) Int. Cl.
*F16K 15/02* (2006.01)
*H01M 8/04* (2016.01)
(Continued)

(52) U.S. Cl.
CPC ............ *F16K 15/02* (2013.01); *F16K 15/144* (2013.01); *F16K 15/18* (2013.01);
(Continued)

(58) Field of Classification Search
None
See application file for complete search history.

(56) References Cited

U.S. PATENT DOCUMENTS 6,280,867 B1 * 8/2001 Elias ............................ 429/423
2005/0249997 A1 * 11/2005 Tomimatsu et al. ............ 429/35
(Continued)

FOREIGN PATENT DOCUMENTS

CN 101375093 A 2/2009
JP 2004293777 A 10/2004
(Continued)

OTHER PUBLICATIONS

Official Communication issued in International Patent Application No. PCT/JP2012/055180, mailed on Apr. 3, 2012.
(Continued)

*Primary Examiner* — Patrick Ryan
*Assistant Examiner* — Zhongqing Wei
(74) *Attorney, Agent, or Firm* — Keating & Bennett, LLP

(57) ABSTRACT

A forward check valve and a fuel cell system are provided which include a valve portion including a valve body, a supporting portion, a hole, and a fixation portion. The valve body contacts a valve seat when the valve portion is accommodated in an opening. The supporting portion supports the valve body so that the valve body is movable in directions in which the valve body moves towards and away from the valve seat. The fixation portion contacts an inner peripheral surface defining the opening of a valve housing to fix the supporting portion when the valve portion is accommodated in the opening. The fixation portion includes protruding portions that protrude from a mount surface of the valve housing when the valve portion is accommodated in the
(Continued)

opening. By fitting the valve portion to the opening, the valve portion is accommodated in the opening of the valve housing.

20 Claims, 12 Drawing Sheets

(51) Int. Cl.
    *F16K 15/18*    (2006.01)
    *F16K 15/14*    (2006.01)
    *H01M 8/10*    (2016.01)

(52) U.S. Cl.
    CPC ... *H01M 8/04186* (2013.01); *H01M 8/04201* (2013.01); *H01M 8/1011* (2013.01); *Y02E 60/523* (2013.01); *Y10T 137/7793* (2015.04)

(56) References Cited

U.S. PATENT DOCUMENTS

| | | | |
|---|---|---|---|
| 2007/0026269 A1* | 2/2007 | Nakakubo | 429/13 |
| 2007/0114290 A1* | 5/2007 | Kempf et al. | 236/12.13 |
| 2007/0209709 A1* | 9/2007 | Shimizu et al. | 137/331 |
| 2009/0095363 A1* | 4/2009 | Nakakubo et al. | 137/843 |
| 2009/0140194 A1* | 6/2009 | Kato et al. | 251/318 |
| 2009/0269650 A1 | 10/2009 | Nakakubo | |
| 2009/0320847 A1* | 12/2009 | Bozanic et al. | 128/205.24 |
| 2010/0075198 A1* | 3/2010 | Ozaki et al. | 429/34 |
| 2010/0286613 A1* | 11/2010 | Ring | 604/152 |
| 2011/0127459 A1 | 6/2011 | Takahashi et al. | |

FOREIGN PATENT DOCUMENTS

| | | |
|---|---|---|
| JP | 2008-059093 A | 3/2008 |
| JP | 2008-082543 A | 4/2008 |
| WO | 2009/157474 A1 | 12/2009 |

OTHER PUBLICATIONS

Official Communication issued in corresponding Chinese Patent Application No. 201280015483.1, mailed on Jul. 28, 2014.

* cited by examiner

FORWARD CHECK VALVE AND FUEL CELL SYSTEM

BACKGROUND OF THE INVENTION

1. Field of the Invention

The present invention relates to a forward check valve that controls a flow of a fluid in a forward direction, and to a fuel cell system including the forward check valve.

2. Description of the Related Art

A pressure reducing valve provided for passive driving and used in a small fuel cell is disclosed in Japanese Unexamined Patent Application Publication No. 2008-59093. The pressure reducing valve is configured so that, when the pressure of a fluid becomes a set pressure, the valve automatically opens and closes by making use of a pressure difference.

FIGS. 1A and 1B are each a sectional view of the pressure reducing valve that is disclosed in Japanese Unexamined Patent Application Publication No. 2008-59093. The pressure reducing valve includes a diaphragm 1, a piston 2, a valve housing 7, a valve seat 3, a valve body 4, a supporting portion 5, and a fixation portion 6. The diaphragm 1 is a movable section. The piston 2 is a transmission mechanism. The valve seat 3, the valve body 4, the supporting portion 5, and the fixation portion constitute a valve portion. The valve body 4 is supported along a periphery thereof by the supporting portion 5. The supporting portion 5 is defined by a resilient bar. The fixation portion 6 fixes the supporting portion 5 to the valve housing 7. Here, each of these members is a plate member. The pressure reducing valve is manufactured by joining each of these members together.

Pressure at a top portion of the diaphragm (movable section) 1 is P0, primary pressure at an upstream side of the valve is P1, pressure at a downstream side of the valve is P2, the area of the valve body 4 is S1, and the area of the diaphragm (movable section) 1 is S2. Here, from the equilibrium of the pressures, as shown in FIG. 1B, the condition for opening the valve is $(P1-P2)S1<(P0-P2)S2$. If P2 is higher than the pressure of this condition, the valve closes, whereas, if P2 is lower than the pressure of this condition, the valve opens. This makes it possible to maintain P2 at a constant value.

For example, a direct methanol fuel cell (DMFC) includes a pump that transports fuel (methanol). In general, although a valve-system pump is provided with a valve non-returning function, the valve-system pump is not provided with a valve forward check function (a function of checking a flow in a forward direction). If a pump that is not provided with a valve forward check function is used, when an upstream-side pressure (pressure in a forward direction) is applied to the fuel, the fuel flows even when the pump is not operating.

The temperature of a fuel cartridge that is built in a fuel cell system may become high due to the external environment, as a result of which high-pressure fluid may be discharged. This may cause excess fluid to be supplied to a fuel cell, and the pump to break in some cases. Accordingly, a valve that checks a flow in a forward direction if high-pressure fluid is applied (hereunder referred to as "forward check valve") is demanded.

However, when manufacturing the pressure reducing valve disclosed in Japanese Unexamined Patent Application Publication No. 2008-59093 and shown in FIGS. 1A and 1B, it is necessary to fix the supporting portion 5 to the valve housing 7 by aligning the valve body 4 so that the valve body 4 comes into contact with or separates from a valve seat 3 in accordance with the displacement of the diaphragm 1. Therefore, it is necessary to precisely perform the alignment.

Since the pressure reducing valve disclosed in Japanese Unexamined Patent Application Publication No. 2008-59093 has a structure in which the supporting portion 5 is fixed to the valve housing 7 at the fixation portion 6, the height of the valve body is increased in correspondence with the thickness of the fixation portion 6.

Valve portions have individual differences due to, for example, manufacturing variations. Therefore, in the structure of the pressure reducing valve disclosed in Japanese Unexamined Patent Application Publication No. 2008-59093, pressurization of a valve seat by a valve portion differs greatly with each pressure reducing valve. That is, a pushing force required to open the valve when the piston 2 of the diaphragm 1 pushes down on the valve body 4 differs greatly with each pressure reducing valve. Therefore, in the structure of the pressure reducing valve disclosed in Japanese Unexamined Patent Application Publication No. 2008-59093, fluid control cannot be performed with sufficient reliability.

SUMMARY OF THE INVENTION

Accordingly, preferred embodiments of the present invention provide a forward check valve in which precise positional alignment of the valve body is not necessary and the valve body is reduced in height, and a fuel cell system including the forward check valve.

Further, preferred embodiments of the present invention provide a forward check valve that reduces or prevents variations in pressurizations of valve seats by valve portions even if the valve portions have individual differences due to, for example, manufacturing variations in the valve portions, a fuel cell system including the forward check valve.

A forward check valve according to a preferred embodiment of the present invention includes a valve housing, a diaphragm that defines a valve chamber in the valve housing, the diaphragm being displaced by pressure of a fluid in the valve chamber, and a valve portion that blocks or allows the fluid to flow into the valve chamber by the displacement of the diaphragm, wherein the valve housing includes an inflow hole, an outflow hole, an opening, and a valve seat, the fluid flowing into the valve chamber via the inflow hole, the outflow hole being connected to a pump and the fluid flowing out from the valve chamber via the outflow hole by suction pressure of the fluid generated by the pump, the opening being connected to the inflow hole and accommodating the valve portion as a result of fitting the valve portion to the opening, the valve seat being positioned at a peripheral edge defining the inflow hole, the valve portion includes a valve body, a supporting portion, and an annular fixation portion, the valve body contacting the valve seat when the valve portion is accommodated in the opening, the supporting portion supporting the valve body so that the valve body is movable in directions in which the valve body moves towards and away from the valve seat, the annular fixation portion contacting an inner peripheral surface defining the opening of the valve housing to fix the supporting portion when the valve portion is accommodated in the opening, and the fixation portion includes a plurality of protruding portions that protrude from an opening-side surface of the valve housing when the valve portion is accommodated in the opening.

With this structure, the valve portion is accommodated in the opening of the valve housing by fitting the valve portion to the opening of the valve housing. When the valve portion is accommodated in the opening of the valve housing, the valve body contacts the valve seat and the fixation portion that fixes the supporting portion also contacts the inner peripheral surface defining the opening of the valve housing. In addition, the supporting portion movably supports the valve body as described above.

Therefore, when a forward check valve having this structure is to be manufactured, the valve portion only needs to be fitted to the opening. That is, when a forward check valve having this structure is to be manufactured, it is not necessary to fix the supporting portion to the valve housing by aligning the valve body so that the valve body comes into contact with or separates from the valve seat in accordance with the displacement of the diaphragm. Consequently, in the structure of the forward check valve having this structure, it is not necessary to perform precise alignment.

If an abnormality occurs in the valve portion when manufacturing a forward check valve having this structure, since the valve portion can be easily replaced by removing the valve portion from the opening of the valve housing, the overall yield of the forward check valve is significantly increased.

Therefore, with the forward check valve having this structure, alignment can be easily performed because it is not necessary to perform precise alignment. Further, in the forward check valve having this structure, since the valve portion is accommodated in the opening of the valve housing, the height of the valve body can be reduced as compared to the structure of the pressure reducing valve disclosed in Japanese Unexamined Patent Application Publication No. 2008-59093 by an amount corresponding to the thickness of the fixation portion.

In this structure, the fixation portion preferably includes a plurality of protruding portions. Therefore, when the forward check valve is aligned with and secured to a substrate (such as a system housing), the fixation portion is compressed by the valve housing and the substrate. Here, preferably, only the protruding portions of the fixation portion are pushed against the substrate.

That is, in the forward check valve having this structure, compared to a case in which the entire periphery of the fixation portion protrudes from an opening-side surface of the valve housing (that is, a case in which the thickness of the fixation portion is greater than the depth of the opening), the area along which the fixation portion is pushed against the substrate is reduced and the volume by which the fixation portion is compressed by the valve housing and the substrate is reduced.

Thus, even if there are individual differences between the protruding lengths of the protruding portions of valve portions due to, for example, manufacturing variations in the valve portions, it is possible to reduce or prevent the differences between the protruding lengths and, thus, reduce or prevent variations in pressurizations of the valve seats by the valve portions. That is, it is possible to reduce or prevent variations in pushing forces required to open the valve portions when the diaphragms push down the valve bodies. Therefore, it is possible to effectively increase the reliability of the valve bodies.

The plurality of protruding portions may preferably be arranged on the fixation portion so as to satisfy a relationship $1/20 < C \cdot 360° \le 1/2$, for example, where one circuit around the annular fixation portion is 360°, a central angle of the protruding portions, which is an angle defined by connecting radial lines that are provided at corresponding ends of the protruding portions to the center of the fixation portion, is θ, and the number of protruding portions is C.

Experiments reveal that, when the plurality of protruding portions satisfy the relationship $1/20 < C \cdot \theta/360° \le 1/2$, the pressure applied to the valve seat by the valve body is sufficiently high and that the amount of change in pressurization due to a difference between the protruding lengths of the protruding portions is very small.

It is preferable that the protruding portions are made of rubber, for example.

In this structure, contactability between the protruding portions of the fixation portion and the top surface of the substrate when the forward check valve has been secured to the substrate is increased.

A fuel cell system according to a preferred embodiment of the present invention includes the forward check valve according to a preferred embodiment of the present invention, a fuel storage section that is connected to the inflow hole of the forward check valve, and a pump that is connected to the outflow hole of the forward check valve.

With this structure, when the forward check valve according to a preferred embodiment of the present invention is used, the fuel cell system including the forward check valve also provides the same advantages.

According to various preferred embodiments of the present invention, it is possible to easily align the valve and to reduce the height of the valve body. Further, it is possible to reduce or prevent variations in pressurizations of valve seats by valve portions even if the valve portions have individual differences due to, for example, manufacturing variations in the valve portions.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First, the principle of operation of a forward check valve provided for passive driving and used in a small fuel cell will be described.

Figure 2A:
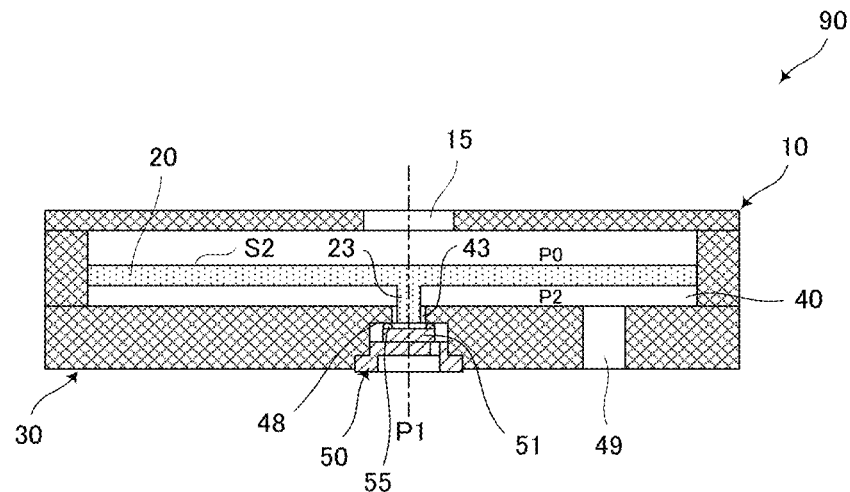
FIGS. 2A and 2B are schematic sectional views of a forward check value, illustrating the principle of operation of the forward check valve.
Figure 2B:
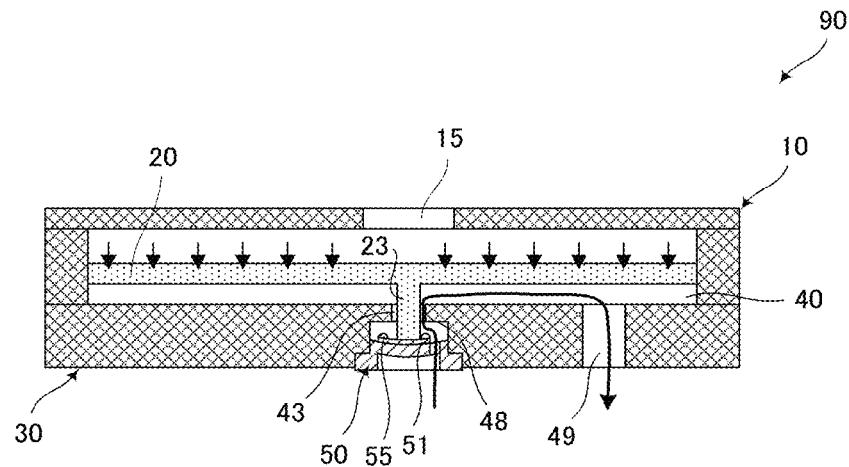

FIG. 2A is a schematic sectional view of a forward check valve 90 in a closed state. FIG. 2B is a schematic sectional view of the forward check valve 90 in an open state. The forward check valve 90 includes a diaphragm 20, a valve housing 30, a cap 10, and a valve portion 50. The diaphragm 20 is a movable section. The diaphragm 20 and the valve housing 30 define a valve chamber 40. The cap 10 is connected to the valve housing 30. The valve portion 50 includes a valve body 51.

The valve housing 30 includes an inflow hole 43, through which a fluid flows into the valve chamber 40, and an outflow hole 49, which is connected to a pump and through which the fluid flows out from the valve chamber 40 by suction pressure of the fluid generated by the pump.

The diaphragm 20 includes a pusher 23, serving as a transmission mechanism, and is displaced by the pressure of the fluid in the valve chamber 40. When the diaphragm 20 is displaced in a direction in which the diaphragm 20 moves towards the valve portion 50, the pusher 23 pushes down the valve body 51.

The valve portion 50 includes an annular valve protrusion 55 at a side of the valve body 51 facing the inflow hole 43, and is arranged so that the valve protrusion 55 contacts a valve seat 48 that is positioned at a peripheral edge defining the inflow hole 43. The valve body 51 contacts or separates from the valve seat 48 by the displacement of the diaphragm 20, so that the flow of the fluid into the valve chamber 40 from the inflow hole 43 is blocked or allowed.

A hole 15 that opens to outside air is provided in a top surface of the cap 10. As a result, atmospheric pressure is applied to a top portion of the diaphragm 20.

The forward check valve 90 is configured such that, when the pressure of the fluid becomes a set pressure, the forward check valve 90 utilizes a pressure difference to automatically open or close the valve portion 50. More specifically, atmospheric pressure at the top portion of the diaphragm 20 is P0, primary pressure at an upstream side of the valve is P1, pressure at a downstream side of the valve is P2, the area of the valve body 51 (here, the area that is determined by the diameter of a region surrounded by the annular valve protrusion 55 because the valve body 51 is provided with the annular valve protrusion 55) is S1, the area of the diaphragm 20 is S2, and a force that urges the valve body 51 upward is Fs. Here, from the equilibrium of the pressures, as shown in FIG. 2B, the condition for opening the valve portion 50 preferably is $(P1-P2)S1+Fs<(P0-P2)S2$, for example. If P2 is higher than the pressure of this condition, the valve portion 50 closes, whereas, if P2 is lower than the pressure of this condition, the valve portion 50 opens. This makes it possible to maintain P2 at a constant value.

First Preferred Embodiment

A forward check valve 101 according to a first preferred embodiment of the present invention is described below.

Figure 3:
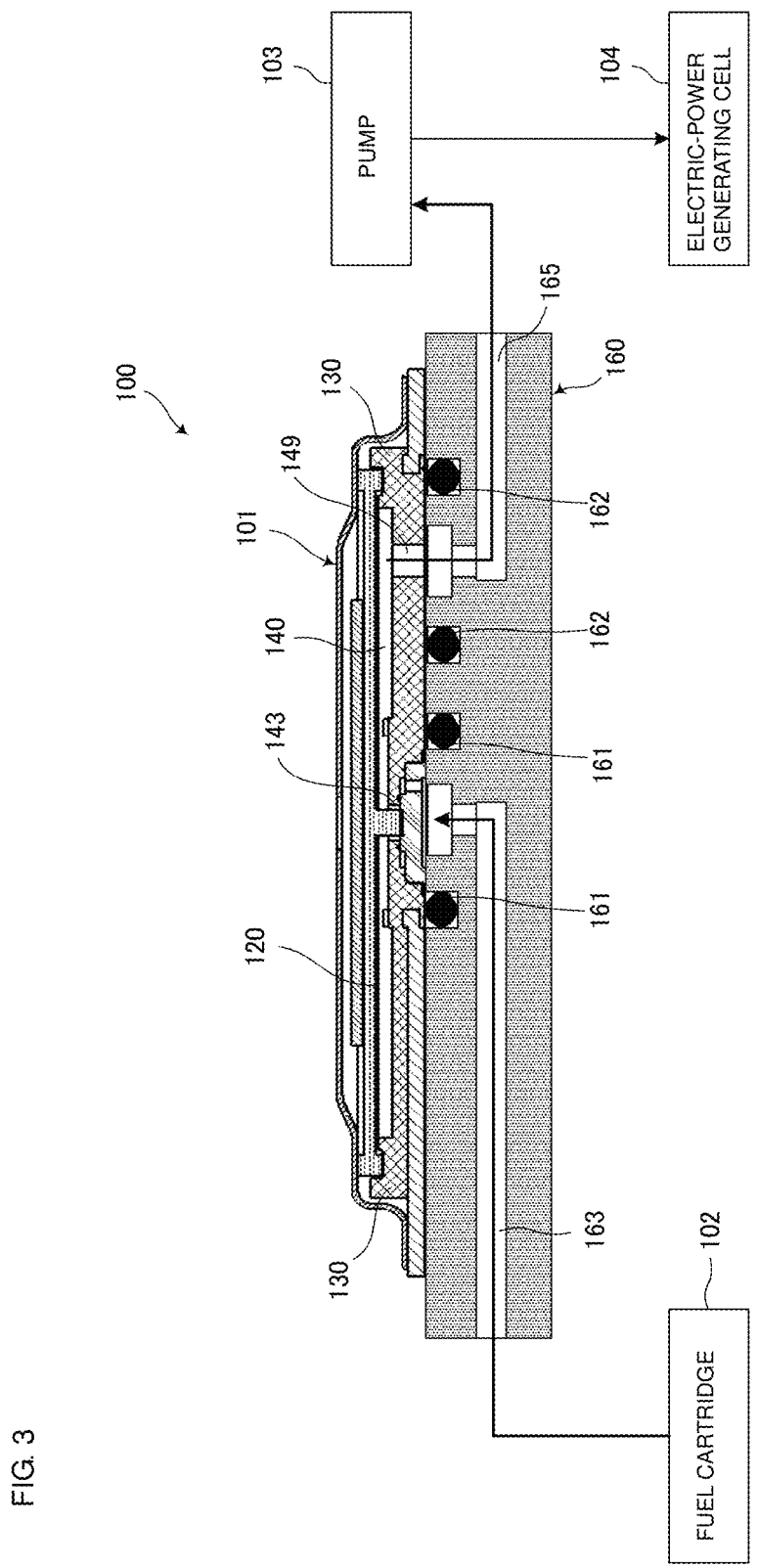
FIG. 3 shows the structure of a fuel cell system including a forward check valve according to a first preferred embodiment of the present invention.

FIG. 3 shows the structure of a fuel cell system 100 including the forward check valve 101 according to the first preferred embodiment of the present invention. The fuel cell system 100 preferably includes a fuel cartridge 102, the forward check valve 101, a pump 103, and an electric-power generating cell 104. The fuel cartridge 102 stores methanol serving as a fuel, for example. The pump 103 transports the methanol, for example. The electric-power generating cell 104 generates electric power when the methanol is supplied thereto from the pump 103.

A direct methanol fuel cell (DMFC) includes the pump 103 that transports methanol serving as a fuel. In general, although the valve-system pump 103 is provided with a valve non-returning function, the valve-system pump 103 is not provided with a valve forward check function. If the pump 103 that is not provided with a valve forward check function is used, when upstream-side pressure (pressure in a forward direction) is applied to the methanol, the methanol flows even when the pump 103 is not operating.

Therefore, it is preferable to use, in combination with the pump 103, the forward check valve 101 that opens and closes by using pump pressure.

Although described in detail below, the forward check valve 101 includes the valve housing 130 which, along with a diaphragm 120, defines a valve chamber 140.

The valve housing 130 includes an inflow hole 143, to which the fuel cartridge 102 is connected through an inflow path 163, and an outflow hole 149, to which the pump 103 is connected through an outflow path 165.

Through O rings 161 and 162 that prevent flow leakage, the forward check valve 101 is surface-mounted to a system housing 160, which includes the inflow path 163 and the outflow path 165 and which is preferably made of polyphenylene sulfide (PPS) resin, for example.

In the fuel cell system 100, methanol flows into the valve chamber 140 from the fuel cartridge 102 through the inflow path 163 and the inflow hole 143. Through the outflow path 165 and the outflow hole 149, the methanol flows out from the valve chamber 140 to the pump 103 by suction pressure of the methanol generated by the pump 103. Then, the methanol is supplied to the electric-power generating cell 104 by the pump 103.

Figure 4:
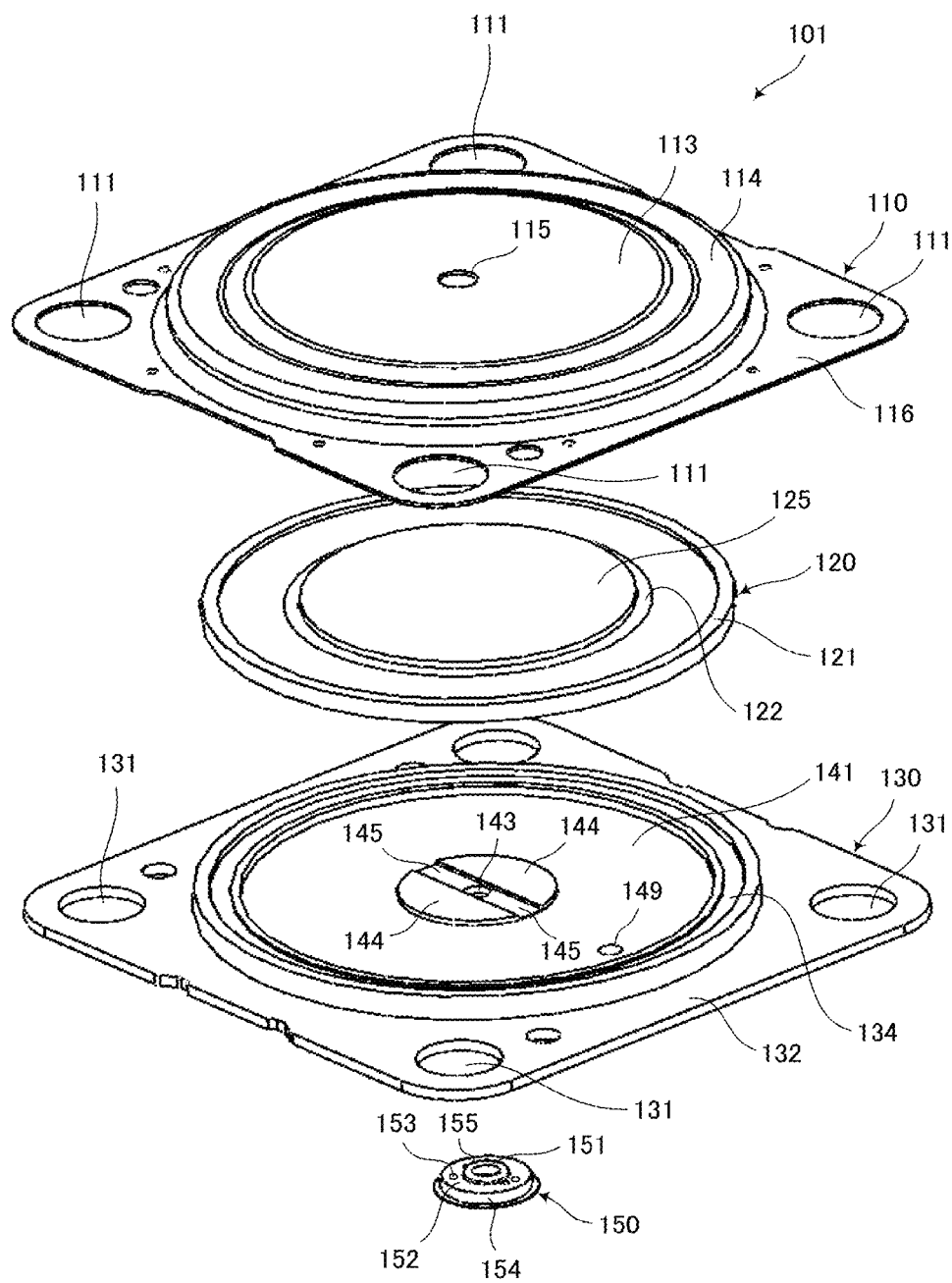
FIG. 4 is an exploded perspective view illustrating the structure of the forward check valve according to the first preferred embodiment of the present invention.
Figure 5A:
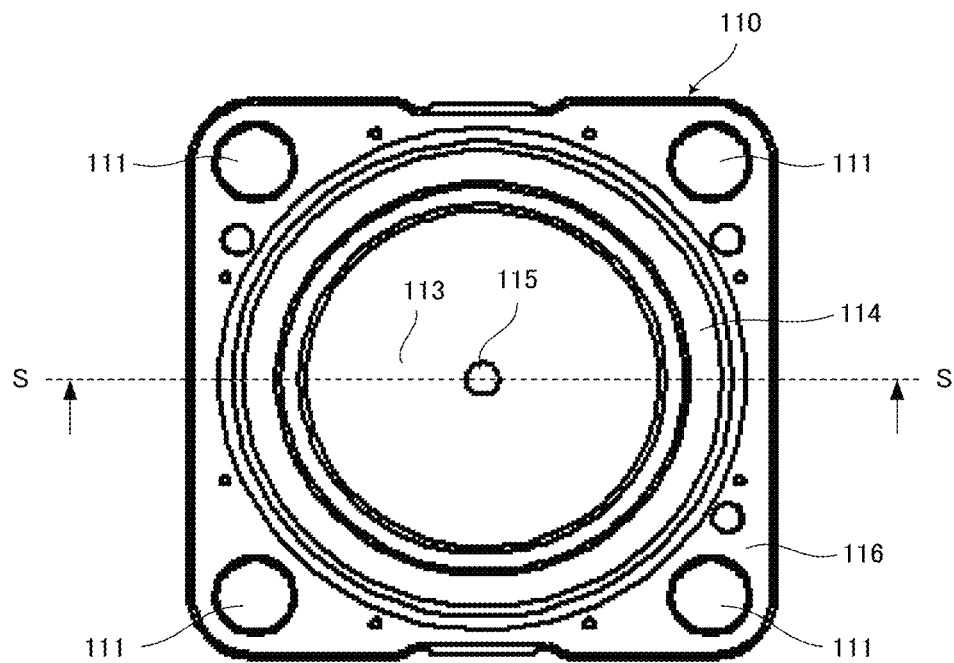
FIG. 5A is a top view of a cap provided at the forward check valve shown in FIG. 4.
Figure 5B:
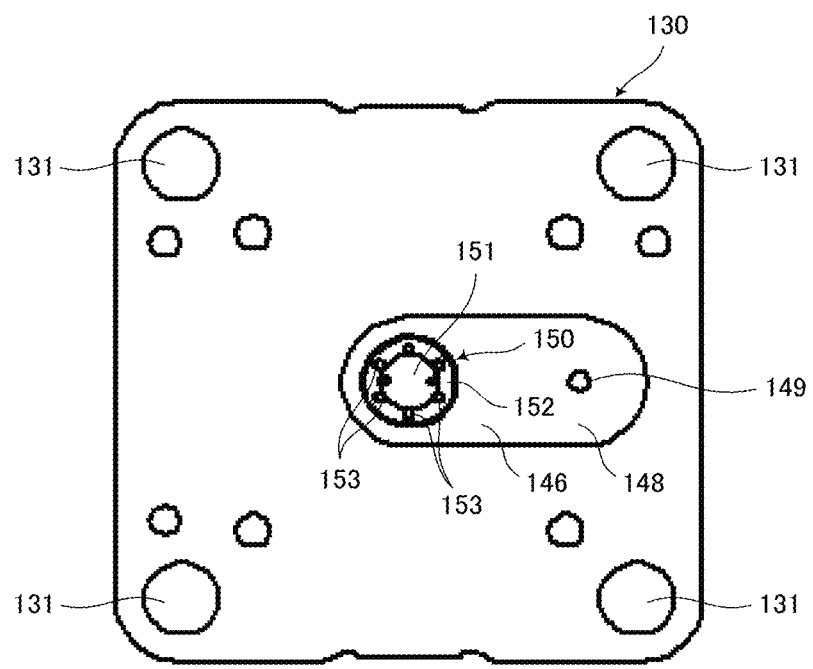
FIG. 5B is a bottom view of a valve housing provided at the forward check valve shown in FIG. 4.
Figure 6:
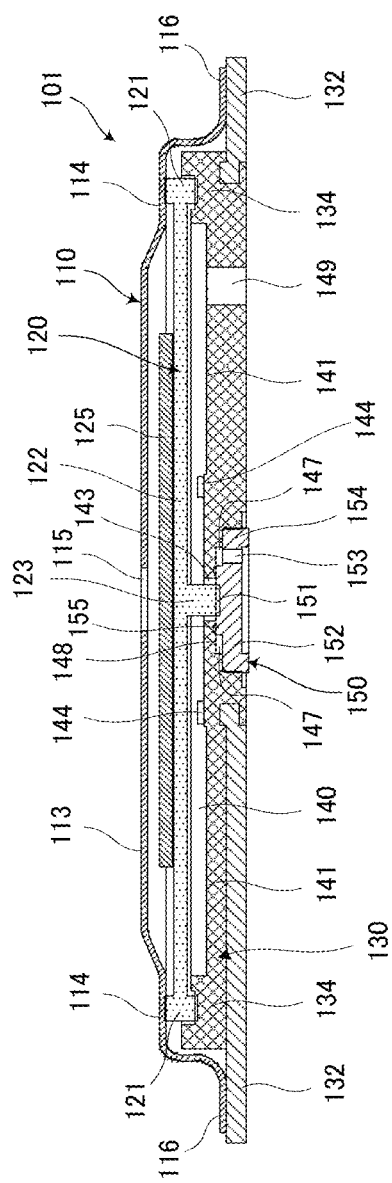
FIG. 6 is a sectional view taken along line S-S in FIG. 5A.

FIG. 4 is an exploded perspective view of the forward check valve 101 according to the first preferred embodiment. FIG. 5A is a top view of the cap 110 provided at the forward check valve 101 shown in FIG. 4. FIG. 5B is a bottom view of the valve housing 130 provided at the forward check valve 101 shown in FIG. 4. FIG. 6 is a sectional view taken along line S-S in FIG. 5A.

As shown in the exploded perspective view of FIG. 4, the forward check valve 101 includes the cap 110, the diaphragm 120, that functions as a movable section, the valve housing 130, and a valve portion 150.

The valve housing 130 preferably has a square or substantially square plate shape, for example. The valve housing 130 includes the inflow hole 143, through which a fluid flows into the valve chamber 140, and the outflow hole 149, to which the pump 103 is connected and through which the fluid flows out from the valve chamber 140 by suction pressure of the fluid generated by the pump 103.

The valve housing 130 also includes screw fixation holes 131, which are used to fix the cap 110 and the valve housing 130 to the system housing 160, and a placement portion 134, on which a peripheral edge portion 121 of the diaphragm 120 is disposed.

As shown in FIGS. 4 and 6, in the valve housing 130, a protrusion 144, with which the diaphragm 120 contacts when the valve portion 150 allows the methanol to flow into the valve chamber 140 from the inflow hole 143, and a flow path 145, which allows the methanol to pass from an inner side to an outer side of the protrusion 144, are provided at a periphery of the inflow hole 143 at a bottom surface 141 of the valve chamber 140 that opposes the diaphragm 120.

As shown in FIG. 5B and FIG. 6, the valve housing 130 also includes an opening 147, which accommodates the valve portion 150 by fitting the valve portion 150 from a mount-surface-146 side of the valve housing 130, and a valve seat 148, which is positioned at a peripheral edge defining the inflow hole 143.

The materials of the valve housing 130 are selected such that the portions 134, 141, 144, 145, and 148 of the valve housing 130 that contact methanol are preferably made of resin that is highly resistant to methanol, such as polyphenylene sulfide (PPS) resin, for example, and edges 132 of the valve housing 130, which are portions of the valve housing 130 that do not contact the methanol, are preferably made of metal, for example. The valve housing 130 is preferably formed by insert molding in which the edges 132, which are preferably metallic portions, are inserted into a mold and subjected to injection molding.

As shown in FIGS. 4 and 6, the diaphragm 120 includes a pusher 123, serving as a transmission mechanism, at a central portion thereof, and preferably has a disc shape whose peripheral edge portion 121 is thicker than its central portion 122. The diaphragm 120 is preferably formed of rubber that is highly resistant to methanol, such as ethylene propylene rubber or silicone rubber. The diaphragm 120 is arranged such that a peripheral edge portion 121 is disposed on the valve housing 130, and defines, along with the valve housing 130, the valve chamber 140.

The central portion 122 of the diaphragm 120 that is provided at an inner side of the peripheral edge portion 121 is displaced by the pressure of the fluid in the valve chamber 140. When the central portion 122 of the diaphragm 120 is displaced in a direction in which the central portion 122 of the diaphragm 20 moves towards the valve portion 150, the pusher 123 pushes down the valve body 151.

When a liquid is used as a fluid in the forward check valve 101, since the surface tension of the liquid is high, a fluid flow path that is larger than that when a gas is used as a fluid in the forward check valve 101 is required. However, in the forward check valve 101 according to the present preferred embodiment, the material of the diaphragm 120 is preferably rubber, for example. Therefore, a movable range of the diaphragm 120 is larger than that when the diaphragm 120 is formed of silicon or metal. Consequently, in the forward check valve 101 according to the present preferred embodiment, it is possible to provide a sufficient flow path for methanol.

As shown in FIGS. 4 and 6, the valve portion 150 is preferably circular or substantially circular, for example. Although described in detail below, the valve body 151 contacts or separates from the valve seat 148 by the displacement of the diaphragm 120, so that the flow of the fluid into the valve chamber 140 from the inflow hole 143 is blocked or allowed.

As shown in FIG. 4, FIG. 5A, and FIG. 6, the cap 110 preferably has a square or substantially square plate shape, and is formed, for example, by punching a stainless steel plate and drawing the stainless steel plate using a mold. The cap 110 includes screw fixation holes 111 to fix the cap 110 and the valve housing 130 to the system housing 160.

Here, with the diaphragm 120 being disposed on the placement portion 134, edges 116 of the metallic cap 110 are connected to metallic edges 132 of the valve housing 130 by welding, for example. When a peripheral edge portion 114 of the cap 110 is connected, the peripheral edge portion 114 pushes the peripheral edge portion 121 of the diaphragm 120, and the peripheral edge portion 121 is sandwiched by the peripheral edge portion 114 and the placement portion 134.

A central portion 113 of the cap 110 includes a hole 115 that opens to outside air. As a result, atmospheric pressure is applied to a top portion of the diaphragm 120.

A circular or substantially circular stainless-steel pressure receiving plate 125 that is made of metal and that receives a differential pressure between the atmospheric pressure and internal pressure in the valve chamber 140 is connected to the diaphragm 120.

Similarly to the above-described forward check valve 90 (see FIG. 2), the forward check valve 101 is configured such that, when the pressure of a fluid becomes a set pressure, the forward check valve 101 utilizes the pressure difference to automatically open or close the valve portion 150.

The valve portion 150 is described in detail below.

Figure 7:
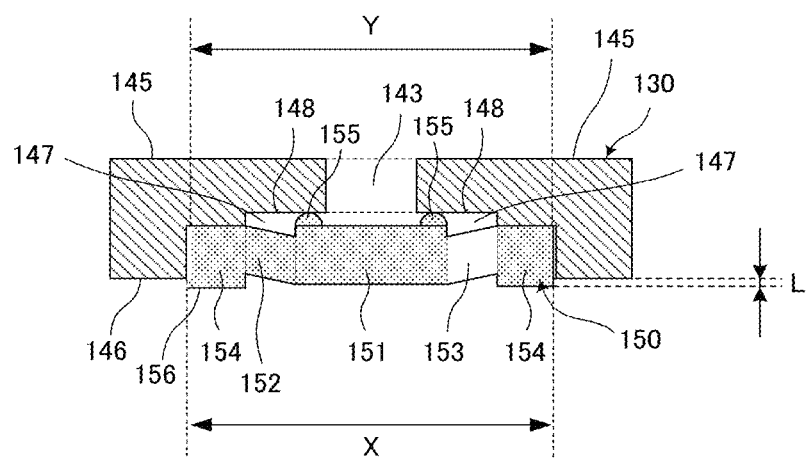
FIG. 7 is an enlarged sectional view of a valve portion shown in FIG. 6.
Figure 8A:
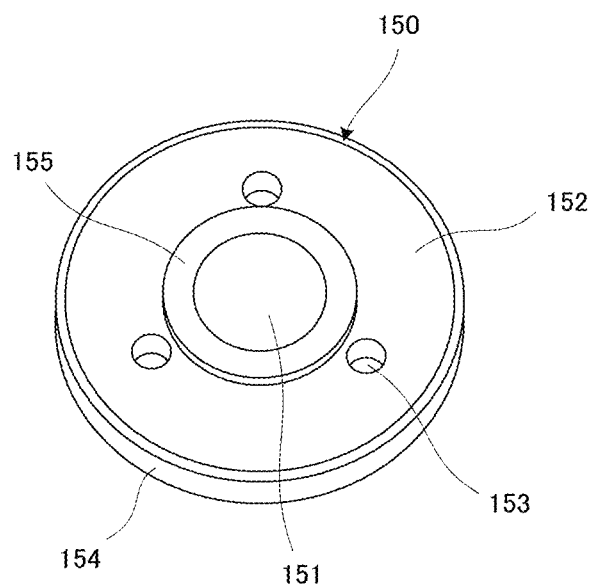
FIGS. 8A and 8B are external perspective views of a valve portion shown in FIG. 4.
Figure 8B:
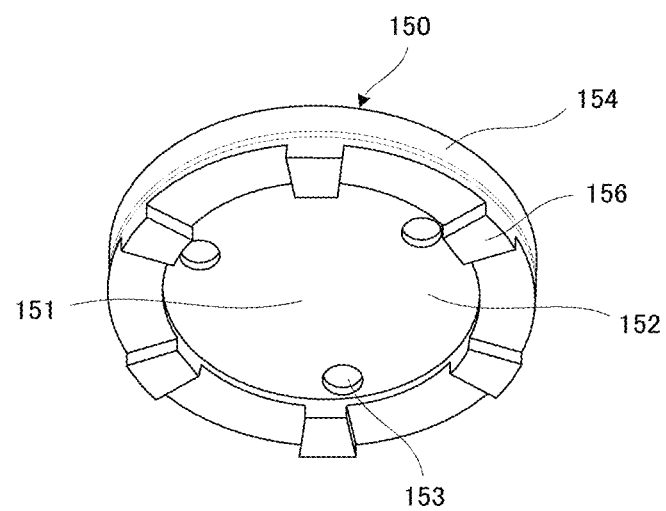

FIG. 7 is an enlarged sectional view of the valve portion 150 shown in FIG. 6. FIGS. 8A and 8B are external perspective views of the valve portion 150 shown in FIG. 4. FIG. 8A illustrates the valve portion 150 as viewed from a front surface thereof. FIG. 8B illustrates the valve portion 150 as viewed from a back surface thereof.

As shown in FIGS. 4, 7, 8A, and 8B, the valve portion 150 is preferably disc-shaped or substantially disc-shaped and made of rubber that is highly resistant to methanol, such as silicone rubber, for example. The valve portion 150 includes the valve body 151, a supporting portion 152, holes 153, and a torus-shaped fixation portion 154. The valve body 151 contacts or separates from the valve seat 148 by the displacement of the diaphragm 120, so that the flow of the fluid (methanol) into the valve chamber 140 from the inflow hole 143 is blocked or allowed. The supporting portion 152 supports the valve body 151 so that the valve body 151 is movable in directions in which the valve body 151 moves towards and/or away from the valve seat 148. The holes 153 allow the methanol to pass therethrough. When the valve portion 150 is accommodated in the opening 147, the torus-shaped fixation portion 154 contacts an inner peripheral surface defining the opening 147 of the valve housing 130 for fixing the supporting portion 152.

In order to increase sealability with respect to the valve seat 148, the valve body 151 is provided with an annular valve protrusion 155 at a side of the inflow hole 143. However, the valve protrusion 155 does not necessarily need to be provided.

The valve body 151 is arranged such that, when the valve portion 150 is accommodated in the opening 147, the valve protrusion 155 of the valve body 151 contacts the valve seat 148, so that the valve portion 151 pressurizes the valve seat 148 in the direction in which the flow of the fluid from the inflow hole 143 into the valve chamber 140 is blocked when the valve is closed.

When the diaphragm 120 moves downward and pushes down the valve body 151, the valve body 151 separates from the valve seat 148. This causes the inflow hole 143 and the holes 153 to communicate with each other, so that the methanol is allowed to flow into the valve chamber 140.

As shown in FIGS. 7 and 8B, the torus-shaped fixation portion 154 includes six fan-shaped protruding portions 156 that protrude from a mount surface 146 at an opening-147 side of the valve housing 130 when the valve portion 150 is accommodated in the opening 147.

Figure 15:
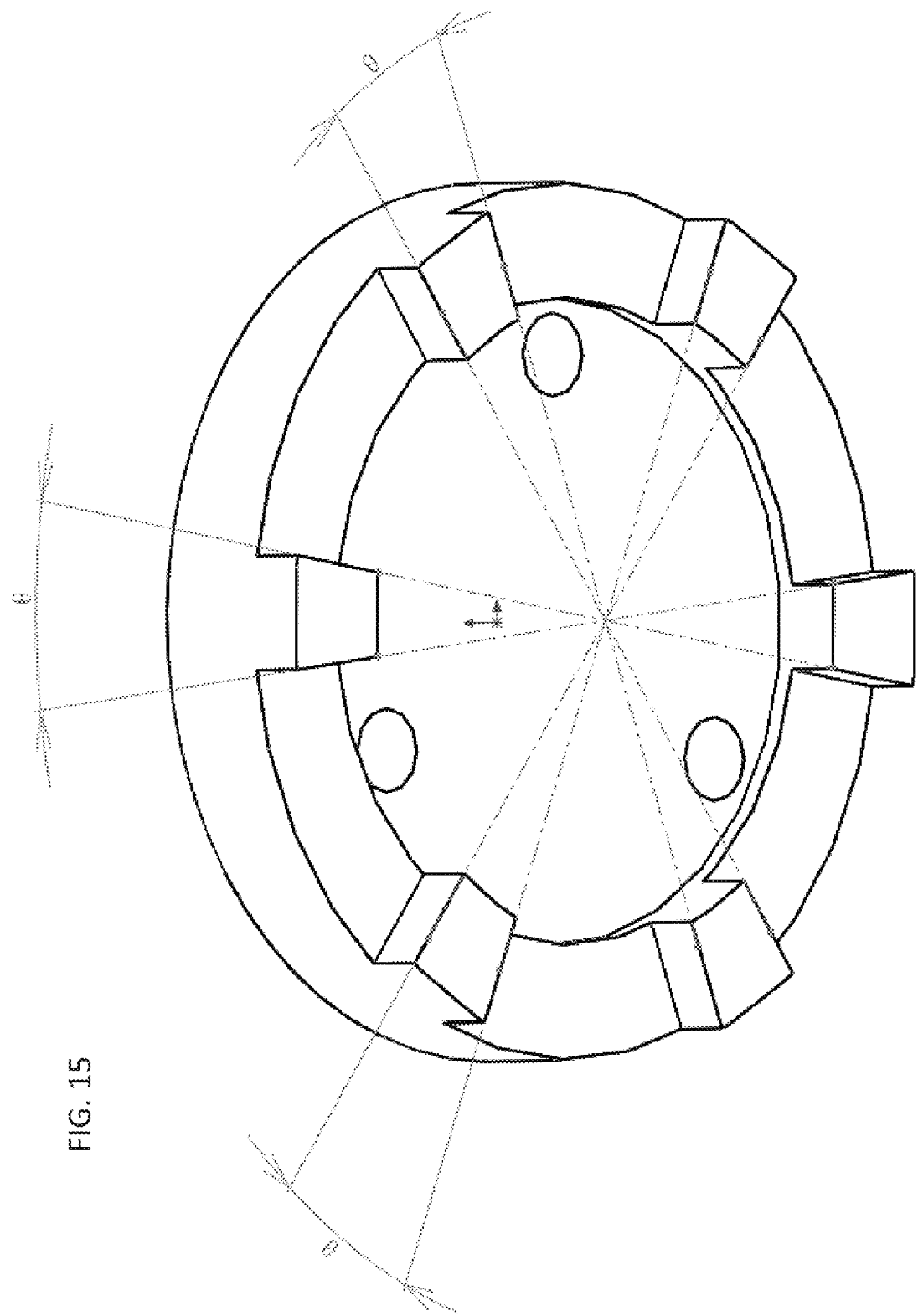
FIG. 15 is an enlarged perspective view of the valve portion shown in FIG. 8B showing an angle θ formed by connecting radial lines provided at corresponding ends of the protruding portions.

Here, the six protruding portions 156 are preferably arranged on the fixation portion 154 so as to satisfy the relationship $1/20<C\cdot\theta/360°\leq 1/2$, for example, where one circuit around the annular fixation portion 154 is 360°, a central angle of fan-shaped protruding portions 156 (an angle formed by connecting radial lines provided at corresponding ends of the protruding portions 156 to the center of the fixation portion 154) is θ (see FIG. 15), and the number of protruding portions 156 is C. An outside diameter X of the fixation portion 154 is preferably greater than or equal to an inside diameter Y of the opening 147.

Next, a non-limiting example of a method of mounting the forward check valve 101 according to the present preferred embodiment to the system housing 160 is described with reference to FIG. 9.

Figure 9:
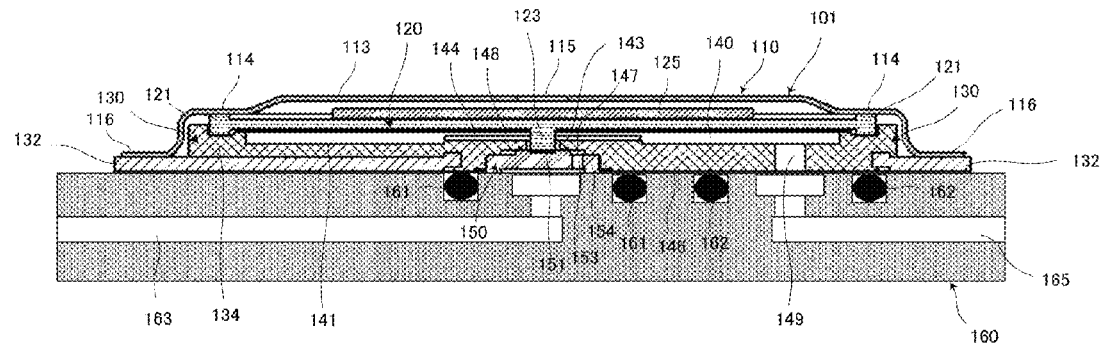
FIG. 9 is a sectional view of the forward check valve secured to a system housing while the valve portion shown in FIG. 6 is fitted to an opening of the valve housing.
Figure 10:
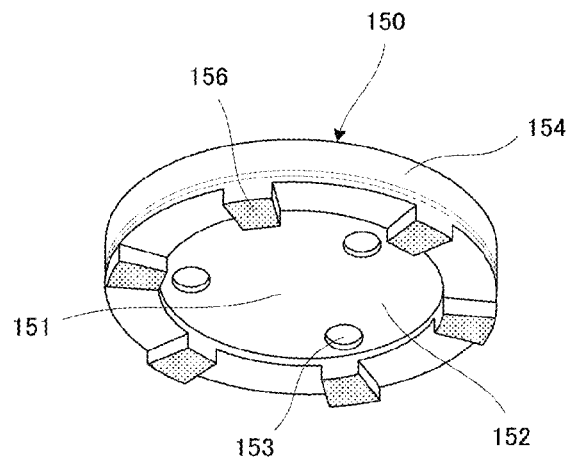
FIG. 10 is an external perspective view of the valve portion, showing a range of maximum dragging force that a fixation portion receives from the system housing when the fixation portion of the valve portion shown in FIG. 9 is compressed by the valve housing and the system housing.

FIG. 9 is a sectional view of the forward check valve 101 secured to the system housing 160 while the valve portion 150 shown in FIG. 6 is fitted to the opening 147 of the valve housing 130. FIG. 10 is an external perspective view of the valve portion 150, showing a range of maximum dragging force that the fixation portion 154 receives from the system housing 160 when the fixation portion 154 of the valve portion 150 shown in FIG. 9 is compressed by the valve housing 130 and the system housing 160. The maximum dragging force range shown in FIG. 10 is shown as a result of calculation using Finite Element Method (FEM).

First, the valve portion 150 is fitted to the opening 147 from the mount-surface-146 side of the valve housing 130, to accommodate the valve portion 150 in the opening 147 of the valve housing 130 to which the cap 110 is connected by welding, for example.

Next, while the valve portion 150 is fitted to the opening 147 of the valve housing 130, the inflow hole 143 of the forward check valve 101 and the inflow path 163 of the system housing 160 are aligned with each other and the outflow hole 149 of the forward check valve 101 and the outflow path 165 of the system housing 160 are aligned with each other.

Then, in the aligned state, screws are inserted into the screw fixation holes 111 of the cap 110 and the screw fixation holes 131 of the valve housing 130 (see FIG. 4), to secure the forward check valve 101 to the system housing 160. This completes the mounting of the forward check valve 101 to the system housing 160.

Accordingly, when the valve portion 150 is accommodated in the opening 147 of the valve housing 130, as shown in FIG. 7, the valve body 151 contacts the valve seat 148, and the fixation portion 154 that fixes the supporting portion 152 also contacts the inner peripheral surface defining the opening 147 of the valve housing 130. In addition, the supporting portion 152 movably supports the valve body 151 as described above.

Figure 1A:
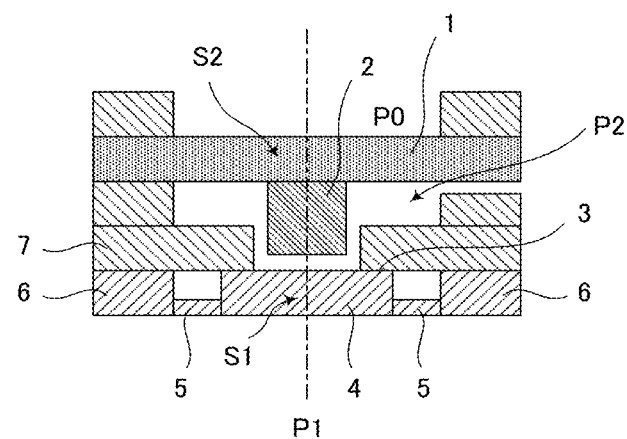
FIGS. 1A and 1B are sectional views illustrating the structure of a forward check valve in Japanese Unexamined Patent Application Publication No. 2008-59093.
Figure 1B:
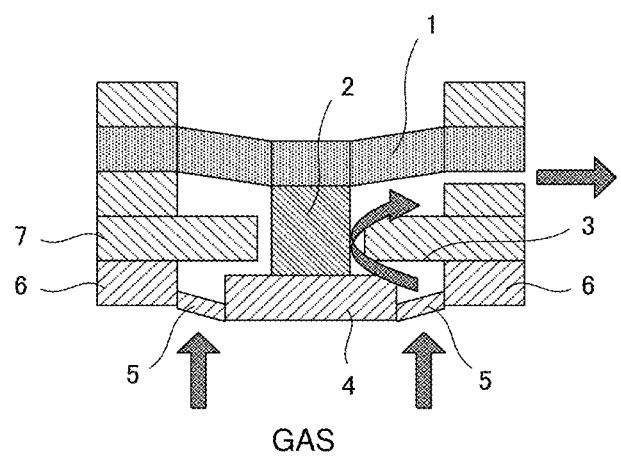

Therefore, when the forward check valve 101 according to the present preferred embodiment is to be manufactured, the valve portion 150 only needs to be fitted to the opening 147. That is, when the forward check valve 101 according to the present preferred embodiment is to be manufactured, it is not necessary to secure the supporting portion 152 to the valve housing 130 by performing the alignment so that the valve body 151 comes into contact with or separates from the valve seat 148 in accordance with the displacement of the diaphragm 120, unlike the pressure reducing valve in Japanese Unexamined Patent Application Publication No. 2008-59093 shown in FIGS. 1A and 1B. Consequently, in the structure of the forward check valve 101 according to the present preferred embodiment, it is not necessary to perform precise alignment.

The outside diameter X of the fixation portion 154 is greater than or equal to the inside diameter Y of the opening 147. Therefore, when the forward check valve 101 is aligned with and secured to the system housing 160, it is possible to prevent the valve portion 150 from falling from the opening 147 of the valve housing 130. Consequently, in the present preferred embodiment, the mounting of the forward check valve 101 to the system housing 160 is facilitated.

Here, it is preferable that the inside diameter Y of the opening 147 and the outside diameter X of the fixation portion 154 satisfy the relationship $1\leq X/Y\leq 1.2$, for example. When $X/Y<1$, the valve portion 150 may fall from the valve housing 130. On the other hand, when $1.2<X/Y$, it becomes difficult to insert the valve portion 150 into the valve housing 130.

If an abnormality occurs in the valve portion 150 when manufacturing the forward check valve 101 according to the present preferred embodiment, since the valve portion 150 can be easily replaced by removing the valve portion 150 from the opening 147 of the valve housing 130, the overall yield of the forward check valve 101 is significantly increased.

Therefore, according to the forward check valve 101 of the present preferred embodiment, the mounting operation is also facilitated and yield is also increased. Further, in the forward check valve 101 according to the present preferred embodiment, since the valve portion 150 is accommodated in the opening 147 of the valve housing 130, the height of the valve body can be smaller than that in the structure of the pressure reducing valve disclosed in Japanese Unexamined Patent Application Publication No. 2008-59093 by an amount corresponding to the thickness of the fixation portion 154.

In the forward check valve 101 according to the present preferred embodiment, as shown in FIGS. 7 and 8B, the torus-shaped fixation portion 154 preferably includes six fan-shaped protruding portions 156 that protrude from the opening-147-side mount surface 146 of the valve housing 130 when the valve portion 150 is accommodated in the opening 147. Each protruding portion 156 is preferable made of rubber, for example.

Therefore, when the forward check valve 101 is secured to the system housing 160, the fixation portion 154 is compressed by the valve housing 130 and the system housing 160 (see FIGS. 7 and 9). Here, in the valve portion 150, as shown in FIG. 10, only the protruding portions 156 of the fixation portion 154 receive maximum dragging force from the system housing 160.

That is, in the forward check valve 101 according to the present preferred embodiment, as compared to a case in which the entire periphery of the fixation portion 154 protrudes from the mount surface 146 of the valve housing 130 (that is, a case in which the thickness of the fixation portion 154 is greater than the depth of the opening 147), the area by which the fixation portion 154 is pushed by the system housing 160 is reduced and the volume by which the fixation portion 154 is compressed by the valve housing 130 and the system housing 160 is reduced.

Thus, even if there are individual differences between the protruding lengths L of protruding portions 156 of valve portions 150 due to, for example, manufacturing variations in the valve portions 150, it is possible to reduce differences between the protruding lengths L and, thus, to reduce variations in pressurizations of valve seats 148 by the valve portions 150. That is, it is possible to reduce variations in pushing forces required for opening the valve portions 150 when pushers 123 of diaphragms 120 push valve bodies 151.

Changes in pressurizations of valve seats 148 by valve portions 150 caused by protruding lengths L of protruding portions 156 of fixation portions 154 are described in detail below.

Figure 11:
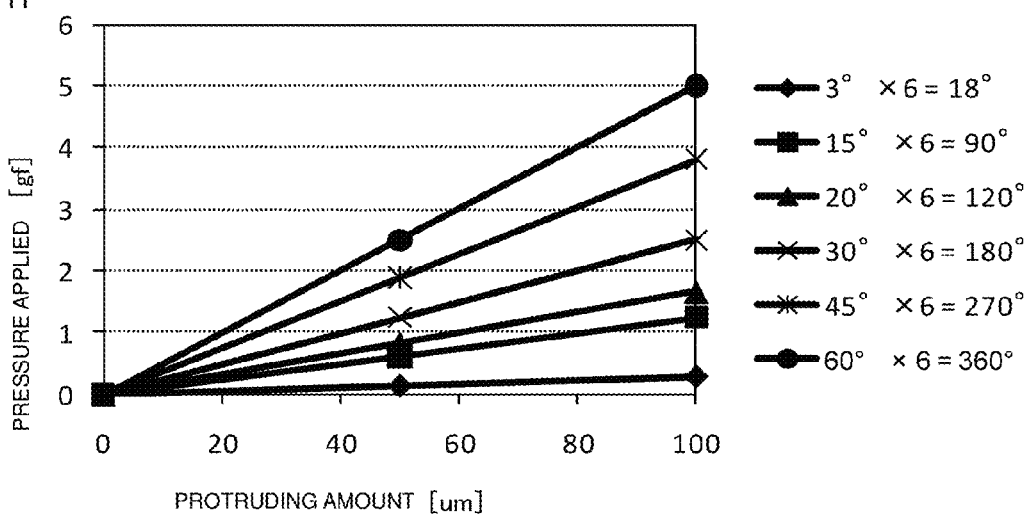
FIG. 11 is a graph showing the relationship between protruding lengths of protruding portions of fixation portions of valve portions like that shown in FIG. 9 and pressurizations of valve seats by the valve portions.

FIG. 11 is a graph showing the relationship between protruding lengths L of protruding portions 156 of fixation portions 154 of valve portions 150 like that shown in FIG. 9 and pressurizations of valve seats 148 by the valve portions 150. Here, the graph of FIG. 11 shows the results calculated by FEM.

As described above, the plurality of protruding portions 156 are preferably arranged so as to satisfy the relationship $\frac{1}{20} < C \cdot \theta/360° \leq \frac{1}{2}$, for example, where one circuit around the torus-shaped fixation portions 154 is 360°, a central angle of the fan-shaped protruding portions 156 (an angle formed by connecting radial lines provided at corresponding ends of the protruding portions 156 to the center of the fixation portion 154) is $\theta$, and the number of protruding portions 156 is C.

As shown in FIG. 11, it is evident that, when $C \cdot \theta/360° \leq \frac{1}{20}$, the pressure that is applied when the forward check valve 101 is secured to the system housing 160 is less than about 0.5 gf (gram-force), for example, as a result of which sufficient pressure is not applied to the valve seat 148 by the valve portion 150, thus making it impossible to sufficiently contact the valve portion 150 with the valve housing 130.

On the other hand, it is evident that, when $\frac{1}{2} < C \cdot \theta/360°$, the amount of change in the pressure that is applied due to differences between the protruding lengths L of the protruding portions 156 is too large. For example, the pressure that is applied changes by about 2.6 gf when the pressures that are applied for protruding lengths L of about 50 μm and about 100 μm for the protruding portions 156 are compared. The pressure that is applied when the protruding length L of the protruding portions 156 is about 100 μm becomes too high, as a result of which the valve portion 150 may not open.

However, it is evident that, as shown in FIG. 11, when the plurality of protruding portions 156 satisfy the relationship $\frac{1}{20} < C \cdot \theta/360° = \frac{1}{2}$, the pressure applied to the valve seat 148 by the valve portion 150 is sufficiently high and the amount of change in the pressure that is applied due to a difference in the protruding lengths L of the protruding portions 156 is small. For example, if $C \cdot \theta/360° = \frac{1}{4}$, the pressure that is applied is about 0.5 gf or higher when the protruding lengths of the protruding portions 156 are about 50 μm and about 100 μm, and the pressure that is applied only changes by about 0.7 gf when the pressures that are applied for the protruding lengths L of about 50 μm and about 100 μm are compared.

Therefore, when the plurality of protruding portions 156 satisfy the relationship $\frac{1}{20} < C \cdot \theta/360° \leq \frac{1}{2}$, even if there are individual differences in the protruding lengths 156 of valve portions 150 due to, for example, manufacturing variations of the valve portions 150, it is possible to reduce variations in pressures applied to valve seats 148 by the valve portions 150.

Similarly, even if there are individual differences in curvature amounts of top surfaces of system housings 160 that contact protruding portions 156 due to, for example, manufacturing variations of the system housings 160, it is possible to reduce variations in pressures applied to valve seats 148 by valve portions 150.

Therefore, according to the forward check valve 101 of the present preferred embodiment, it is possible to reduce variations in pushing forces required for opening valve portions 150 when pushers 123 of diaphragms 120 push down valve bodies 151. Consequently, it is possible to increase the reliability of the valve bodies.

In the structure described above, the portions 134, 141, 144, 145, and 148 of the valve housing 130 that contact methanol are all preferably made of resin, for example, and the diaphragm 120 and the valve portion 150 are preferably made of rubber, for example. Therefore, metallic ions are not eluted in methanol (see FIG. 9). Consequently, in the forward check valve 101 according to the present preferred embodiment, deterioration of characteristics of DMFC caused by the elution of the metallic ions does not occur.

Thus, when the forward check valve 101 according to the present preferred embodiment is used, the fuel cell system 100 including the forward check valve 101 also provides the same advantages.

Second Preferred Embodiment

Figure 12A:
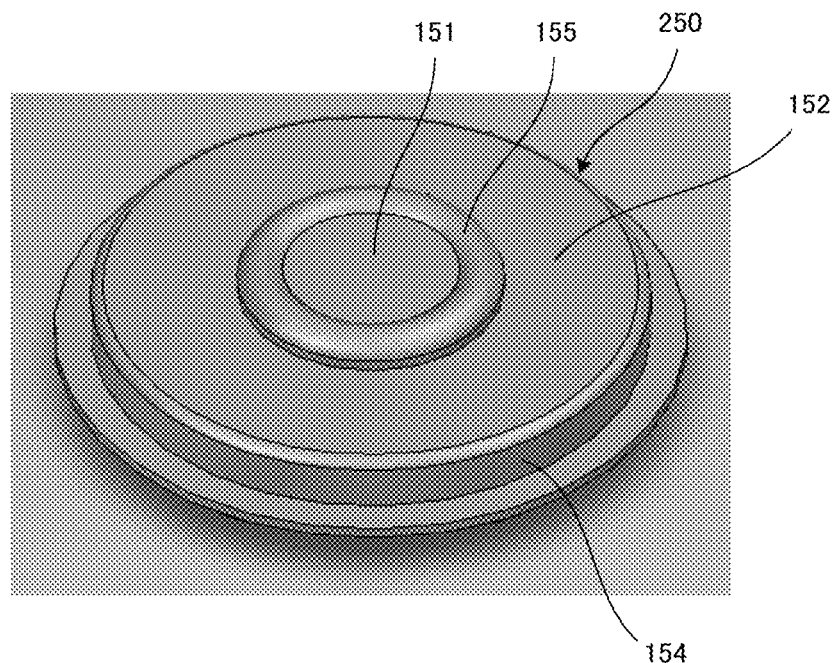
FIGS. 12A and 12B are external perspective views of a valve portion included in a forward check valve according to a second preferred embodiment of the present invention.
Figure 12B:
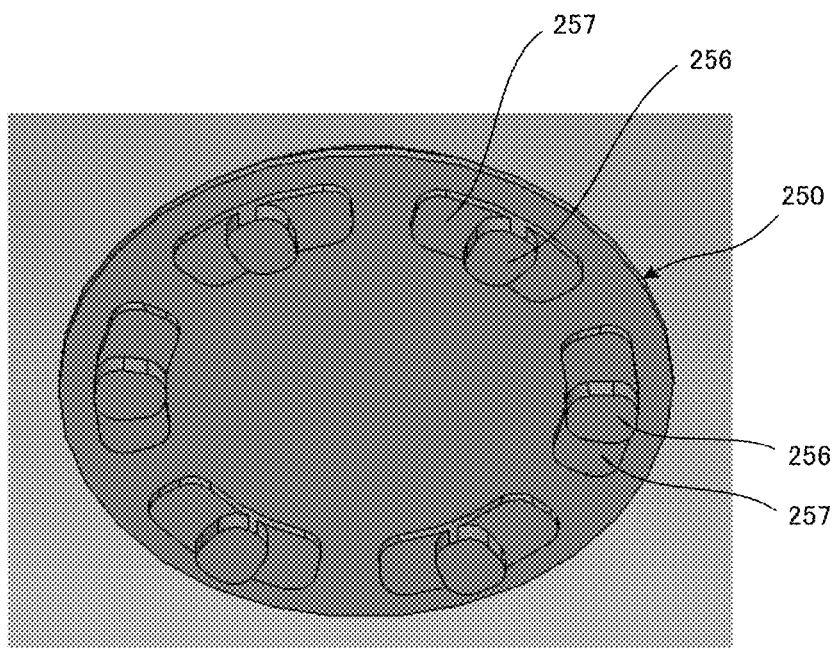
Figure 13:
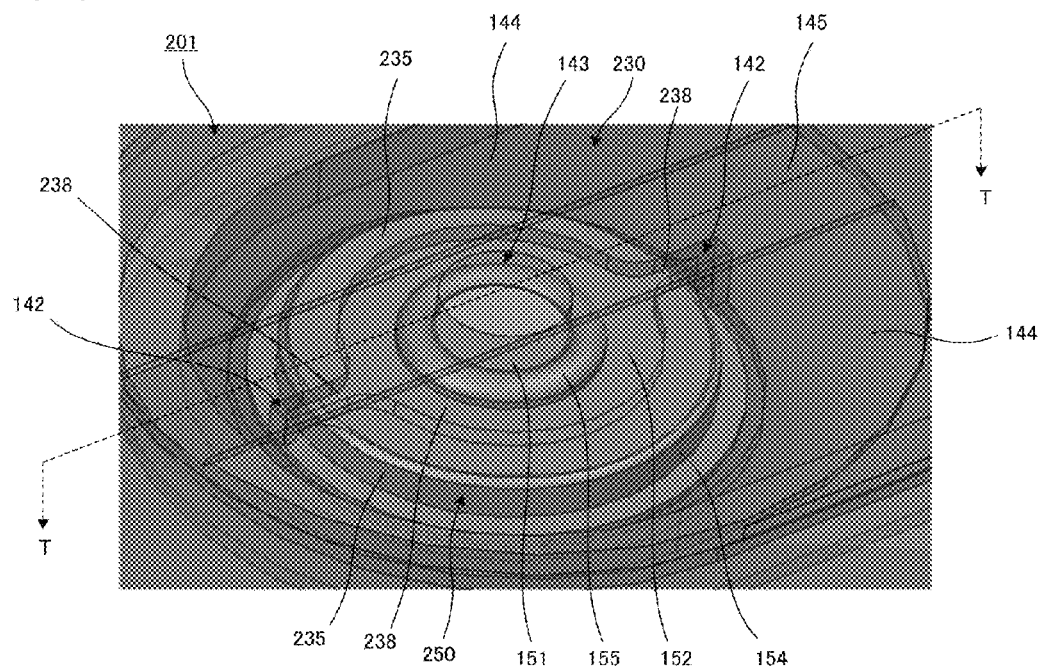
FIG. 13 is an enlarged perspective view of the vicinity of an inflow hole of a valve housing in the forward check valve according to the second preferred embodiment of the present invention.
Figure 14:
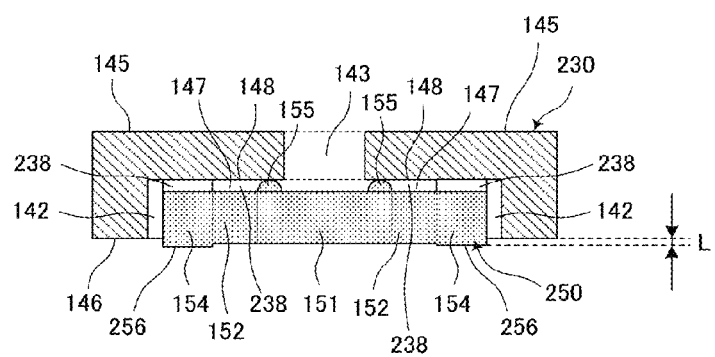
FIG. 14 is an enlarged sectional view of a valve housing and a valve portion taken along line T-T shown in FIG. 13.

FIGS. 12A and 12B are external perspective views of a valve portion 250 included in a forward check valve 201 according to a second preferred embodiment of the present invention. FIG. 12A illustrates the valve portion 250 as viewed from a front surface thereof. FIG. 12B illustrates the valve portion 250 as viewed from a back surface thereof. FIG. 13 is an enlarged perspective view of the vicinity of an inflow hole 143 of a valve housing 230 in the forward check valve 201 according to the second preferred embodiment of the present invention. FIG. 14 is an enlarged sectional view of the valve housing 230 and the valve portion 250 taken along line T-T shown in FIG. 13. Here, FIG. 13 is a perspective view of a state when the valve portion 250 is accommodated in an opening 147 of the valve housing 230.

The forward check valve 201 according to the present preferred embodiment differs from the forward check valve 101 according to the first preferred embodiment in the valve portion 250 and the valve housing 230. The other structural features are preferably the same or substantially the same.

As shown in FIG. 12A, the valve portion 250 differs from the valve portion 150 in that holes 153 are not provided.

As shown in FIG. 12B, a torus-shaped fixation portion 154 preferably includes six fan-shaped protruding portions 256 that protrude from an opening-147-side mount surface 146 of the valve housing 230 when the valve portion 250 is accommodated in the opening 147 of the valve housing 230.

Further, as shown in FIG. 12B, the fixation portion 154 preferably includes fan-shaped plates 257 near the corresponding protruding portions 256. Each fan-shaped plate 257 stabilizes the orientation of the valve portion 250 when the forward check valve 201 is secured to a system housing 160 and the fixation portion 154 is compressed by the valve housing 230 and the system housing 160.

As shown in FIGS. 9, 13, and 14, the valve housing 230 differs from the valve housing 130 in that the valve housing 230 includes a flow path 142 and a housing protrusion 235. The flow path 142 communicates with an inflow path 163 of the system housing 160 and the housing protrusion 235 contacts the valve portion 250 to define a flow path 238 along with the valve portion 250, when the valve portion 250 is accommodated in the opening 147 and the forward check valve 201 is secured to the system housing 160.

Next, a non-limiting example of a method of mounting the forward check valve 201 according to the present preferred embodiment to the system housing 160 is described with reference to FIGS. 9, 13, and 14. First, the valve portion 250 is fitted to the opening 147 from a mount-surface-146-side of the valve housing 230, to accommodate the valve portion 250 in the opening 147 of the valve housing 230 to which a cap 110 is joined.

Next, while the valve portion 250 is fitted to the opening 147 of the valve housing 230, the inflow hole 143 of the forward check valve 201 and the inflow path 163 of the system housing 160 are aligned with each other and the outflow hole 149 of the forward check valve 201 and the outflow path 165 of the system housing 160 are aligned with each other.

Then, in the aligned state, screws are inserted into screw fixation holes 111 of the cap 110 and screw fixation holes 131 of the valve housing 230 (see FIG. 4), to secure the forward check valve 201 to the system housing 160. This completes the mounting of the forward check valve 201 to the system housing 160.

In the forward check valve 201 that is mounted to the system housing 160, when the valve is open, fluid that flows from the inflow path 163 of the system housing 160 flows into a valve chamber 140 via the flow path 142 and the flow path 238 that is surrounded by the valve protrusion 155 and the housing protrusion 235.

Therefore, in the present preferred embodiment, it is no longer necessary for the valve portion 250 to include holes 153 that pass fluid therethrough. Thus, according to the present preferred embodiment, since it is possible for the structure of the valve portion 250 to be simplified without holes 153, manufacturing cost of the valve portion 250 can be considerably reduced.

Although, in the preferred embodiments described above, methanol is preferably used as a highly active fluid, the fluid may be, for example, a gas, a liquid, a gas-liquid mixture flow, a liquid-solid mixture flow, or a solid-gas mixture flow.

Although, in the preferred embodiments described above, six protruding portions 156 and six protruding portions 256 are preferably provided, the number of protruding portions may actually be other than six. Similarly, the central angles of the protruding portions 156 and 256 may be angles other than the angles shown in FIGS. 8B and 12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A forward check valve comprising:
a valve housing;
a diaphragm defining a valve chamber in the valve housing, the diaphragm being displaced by pressure of a fluid in the valve chamber; and
a valve portion arranged to block or allow the fluid to flow into the valve chamber due to displacement of the diaphragm; wherein the valve housing includes an inflow hole, an outflow hole, an opening, and a valve seat arranged such that the fluid flows into the valve chamber via the inflow hole, the outflow hole is connected to a pump and the fluid flows out from the valve chamber via the outflow hole by suction pressure of the fluid generated by the pump, the opening is connected to the inflow hole and accommodating the valve portion as a result of fitting the valve portion to the opening, and the valve seat is positioned around a periphery of the inflow hole;

the valve portion includes a valve body, a supporting portion, and an annular fixation portion arranged such that the valve body contacts the valve seat when the valve portion is accommodated in the opening, the supporting portion supports the valve body so that the valve body is movable in directions in which the valve body moves towards and away from the valve seat, and the annular fixation portion contacts a peripheral surface defining the opening of the valve housing to fix the supporting portion when the valve portion is accommodated in the opening; and the fixation portion includes a plurality of protruding portions that protrude from an opening-side surface of the valve housing when the valve portion is accommodated in the opening.

2. The forward check valve according to claim 1, wherein the plurality of protruding portions are arranged on the fixation portion so as to satisfy a relationship $1/20 < C \cdot \theta / 360° \leq 1/2$, where one circuit around the annular fixation portion is 360°, a central angle of the protruding portions, which is an angle defined by connecting radial lines that are provided at corresponding ends of the protruding portions to a center of the fixation portion, is $\theta$, and a number of protruding portions is C.

3. The forward check valve according to claim 1, wherein the protruding portions are made of rubber.

4. The forward check valve according to claim 1, further comprising a cap arranged so that the diaphragm is sandwiched between the valve housing and the cap.

5. The forward check valve according to claim 4, wherein the valve housing includes fixation holes arranged to fix the cap and the valve to a fuel cell system housing.

6. The forward check valve according to claim 4, wherein the cap includes a hole in a central portion thereof that is open to outside air.

7. The forward check valve according to claim 4, wherein a circular or substantially circular pressure receiving plate is connected to the diaphragm.

8. The forward check valve according to claim 1, wherein the valve housing has a square or substantially square plate shape.

9. The forward check valve according to claim 1, wherein the valve housing includes a placement portion on which a peripheral edge portion of the diaphragm is disposed.

10. The forward check valve according to claim 1, wherein the valve housing includes a protrusion with which the diaphragm contacts when the valve portions allow the fluid to flow into the valve chamber.

11. The forward check valve according to claim 10, wherein the valve housing includes a flow path which allows the fluid to flow from an inner side to an outer side of the protrusion.

12. The forward check valve according to claim 10, wherein the protrusion is provided at a periphery of the inflow hole.

13. The forward check valve according to claim 10, wherein the protrusion is made of polyphenylene sulfide resin and an outer peripheral portion of the valve housing is made of a metal.

14. The forward check valve according to claim 1, wherein the valve housing is made of polyphenylene sulfide resin and a metal.

15. The forward check valve according to claim 1, wherein the diaphragm includes a pusher at a central portion thereof, the pusher being arranged to push on the valve body.

16. The forward check valve according to claim 1, wherein the diaphragm includes a peripheral portion and a central portion, the peripheral portion being thicker than the central portion.

17. The forward check valve according to claim 1, wherein the diaphragm is made of rubber.

18. The forward check valve according to claim 1, wherein the diaphragm is made of one of ethylene propylene rubber and silicone rubber.

19. The forward check valve according to claim 1, wherein the valve portion has a circular or substantially circular shape.

20. A fuel cell system comprising:
   the forward check valve according to claim 1;
   a fuel storage section that is connected to the inflow hole of the forward check valve; and
   a pump that is connected to the outflow hole of the forward check valve.

* * * * *